(12) United States Patent
Yeh et al.

(10) Patent No.: US 7,982,339 B2
(45) Date of Patent: Jul. 19, 2011

(54) CONTROLLING METHOD OF A BATTERY MODE OF A UNINTERRUPTIBLE POWER SUPPLY FOR AN ACTIVE POWER FACTOR CORRECTED LOAD

(75) Inventors: Shou-Ting Yeh, Taipei (TW); Yung-Mei Lin, Taipei (TW)

(73) Assignee: Cyber Power System Inc., Taipei (TW)

( * ) Notice: Subject to any disclaimer, the term of this patent is extended or adjusted under 35 U.S.C. 154(b) by 169 days.

(21) Appl. No.: 12/382,503

(22) Filed: Mar. 18, 2009

(65) Prior Publication Data
US 2010/0237701 A1    Sep. 23, 2010

(51) Int. Cl.
*H02J 3/02* (2006.01)
(52) U.S. Cl. ......................................................... 307/66
(58) Field of Classification Search .............. 307/64–66; 713/320, 323
See application file for complete search history.

(56) References Cited

U.S. PATENT DOCUMENTS

| | | | | | |
|---|---|---|---|---|---|
| 5,602,462 | A | * | 2/1997 | Stich et al. | 323/258 |
| 5,856,712 | A | * | 1/1999 | Suzuki et al. | 307/64 |
| 6,359,794 | B1 | * | 3/2002 | Real | 363/17 |
| 7,688,048 | B2 | * | 3/2010 | Nielsen | 323/268 |

* cited by examiner

*Primary Examiner* — Albert W Paladini
(74) *Attorney, Agent, or Firm* — Bacon & Thomas, PLLC

(57) ABSTRACT

A controlling method of a battery mode of a UPS for an active PFC power supply has the following acts of monitoring the AC power source and determining whether the AC power source is terminated or not, wherein if a determining result is positive, the controlling method proceeds to next act, and switching to the battery mode and converting a DC power source of a battery to a square wave. The square wave has a period, and each half of the period is alternately constituted by at least two ON times and at least two OFF times, and each of the at least two OFF times is equal to or less than a hold-up time of the active PFC load having a hold-up time circuit. Therefore, the voltage of the bulk capacitor of the active PFC power supply under a discharge condition is not lower than the low threshold voltage, since the OFF time of the square wave signal will be kept equal to or less than the hold-up time.

4 Claims, 7 Drawing Sheets

CONTROLLING METHOD OF A BATTERY MODE OF A UNINTERRUPTIBLE POWER SUPPLY FOR AN ACTIVE POWER FACTOR CORRECTED LOAD

BACKGROUND OF THE INVENTION

1. Field of the Invention

The present invention relates to an uninterruptible power supply (UPS), especially to a controlling method of a battery mode of an UPS for an active power factor corrected load having a hold-up time circuit.

2. Description of Related Art

The Computer Business Equipment Manufacturer's Association creates the CBEMA guideline. The guideline specifies that all computer business equipment has to provide a hold-up time of at least 8ms after the power source is terminated.

The power supply, for example, has a hold-up time circuit, that is, the amount of time that a power supply can continue to supply the load after input power is terminated. The duration of a BLACKOUT or TRANSFER TIME is the time that a power supply can accept without any disturbance of the output. Therefore, a computer equipment using the power supply with a hold-up time circuit has enough time to orderly terminate the operations of a data-processing procedure. In addition, if the AC power source is supplied to a switching power supply through a UPS, the hold-up time is used to switch over to the UPS operation after the AC power is terminated.

The switching power supply is one kind of power supply and uses an active power factor corrected (PFC) circuit to increase power translation efficiency up to 98%. Therefore, the computer equipment generally uses the active PFC switching power supply to save power. With reference to FIG. 4, an active PFC switching power supply (30) has a front end rectifier (31), a bulk capacitor ($C_{BULK}$) and a DC to DC converter (32). The front end rectifier (31) has a full bridge rectifier (BD) and an active PFC circuit. The full bridge rectifier (BD) is connected to an external AC power source (AC/IN) and then rectifies the AC power source to a DC power. The bulk capacitor ($C_{BULK}$) is connected to an output of the PFC circuit, so the bulk capacitor ($C_{BULK}$) is charged by the DC power from the PFC circuit. In general, the bulk capacitor ($C_{BULK}$) usually uses about 100 uF to store about hundred voltages of the DC power therein. The bulk capacitor ($C_{BULK}$) discharges a short term DC power for the DC to DC converter (32). Therefore, the DC to DC converter (32) continually outputs the DC power source to a computer equipment for a few milliseconds after the external AC power source (AC/IN) is terminated. With further reference to FIGS. 5A and 5B, when the AC power source is terminated, a voltage of the bulk capacitor ($C_{BULK}$) is gradually decreased. Once the voltage of the bulk capacitor is lower than a low threshold voltage ($V_{BL}$), the DC to DC converter does not operate and the active PFC switching power supply (30) does not supply DC power to the computer equipment anymore. Therefore, the hold up time ($T_H$) is defined to a term between the high voltage ($V_{BH}$) and the low threshold voltage ($V_{BL}$).

In general, the computer equipment requires a UPS to provide an emergency power when the AC power source is terminated. Therefore, the UPS has a line mode and a battery mode. The line mode of the UPS is operated during the AC power source is normal and the battery mode of the UPS is operated when the line mode is fails. With reference to FIG. 6, the UPS (40) has an inverter (41), a transformer (42), a battery charger (43) and a battery set (44). Transformer (42) is connected between the AC power source (AC/IN), the active PFC switching power supply (30), the inverter (41) and the battery charger (43). When the AC power source (AC/IN) is normal, the AC power source (AC/IN) is connected to the switching power supply (30) and the battery set (44) is charged through the battery charger (43) to store DC power. If the AC power source is abnormal or terminated, the line mode fails and the inverter (41) converts the DC power of the battery set (44) to a square wave.

The inverter (41) has a controller (411) and two power transistors (Q1, Q2) connected to the transformer (42) in serial. The controller (411) is connected to controlling terminals (G1, G2) of the power transistors (Q1, Q2), so as to turn on or turn off the two power transistors (Q1, Q2). With further reference to FIG. 7B and 7C, the controller (411) outputs two PWM signals ($V_{G1}$, $V_{G2}$) to the corresponding power transistors (Q1, Q2) to alternately switch the two power transistors (Q1, Q2). With further reference to FIG. 7A, the UPS (40) outputs the square wave ($V_O$) to the switching power supply (30). However, an OFF time ($T_{12}$) between two adjacent pulses (P1, P2) in a period (T) may be longer than the hold-up time ($T_H$) of the active PFC switching power supply (30). The UPS (30) does not supply emergency power according to the pulse (P2) to the active PFC switching power supply (30) during the hold-up time ($T_H$), so the voltage of the bulk capacitor ($C_{BULK}$) is lower than the low threshold voltage ($V_{BL}$). Therefore, the DC to DC converter shuts down and does not output the DC power source to the computer equipment even the battery mode of the UPS is still working.

To overcome the shortcomings, the present invention provides a controlling method of the battery mode of the UPS to mitigate or obviate the aforementioned problems.

SUMMARY OF THE INVENTION

The main objective of the present invention is to provide a controlling method of a battery mode of a UPS for an active PFC switching power supply that ensures to supply an emergency power to the active PFC switching power supply during hold-up time.

The controlling method of a battery mode of a UPS for an active PFC power supply has the following acts of monitoring the AC power source and determining whether the AC power source is terminated or not, wherein if a determining result is positive, the controlling method proceeds to the next act, for switching to the battery mode and converting DC power source of a battery set to a square wave. The square wave has a period, and each half of the period is alternately constituted by at least two ON times and at least two OFF times, and each of the at least two OFF times is equal to or less than a hold-up time of the active PFC load having a hold-up time circuit. Therefore, the voltage of the bulk capacitor of the active PFC power supply under a discharge condition is not lower than the low threshold voltage, since the OFF time of the square wave signal will be kept equal to or less than the hold-up time.

Other objectives, advantages and novel features of the invention will become more apparent from the following detailed description when taken in conjunction with the accompanying drawings.

DETAILED DESCRIPTION OF THE PREFERRED EMBODIMENT

The UPS has a line mode and a battery mode. If the UPS detects and determines that an external AC power source is normal, the line mode is operated and a load having a hold-up time circuit is directly connected to the AC power source. An active PFC switching power supply is used as the load of the UPS. If the UPS detects and determines that the AC power source is terminated, the battery mode of the UPS will be executed.

Figure 2A:
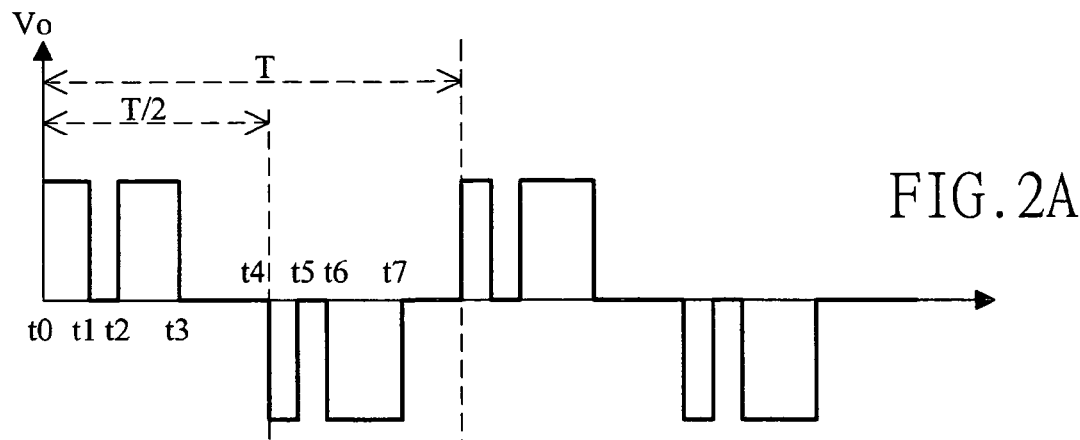
FIGS. 2A to 2C are voltage waveform diagrams of the UPS in accordance with the present invention.

A controlling method of the UPS in accordance with the present invention has the following acts of:

(a) monitoring the AC power source and determining whether the AC power source is terminated or not; wherein if a determining result is positive, the controlling method proceeds to the next act; and (b) switching to the battery mode and converting a DC power source of a battery set to a square wave, wherein the square wave has a period (T). With reference to FIG. 2A, at least two ON times (t0-t1) (t2-t3) and at least two OFF times (t1-t2) (t3-t4) are alternately constituted to each half of the period (T) and each of the at least two OFF times (t1-t2) (t3-t4) is equal to or less than a hold-up time. In a preferred embodiment, the duration of the OFF time is less than 8 ms.

Figure 1:
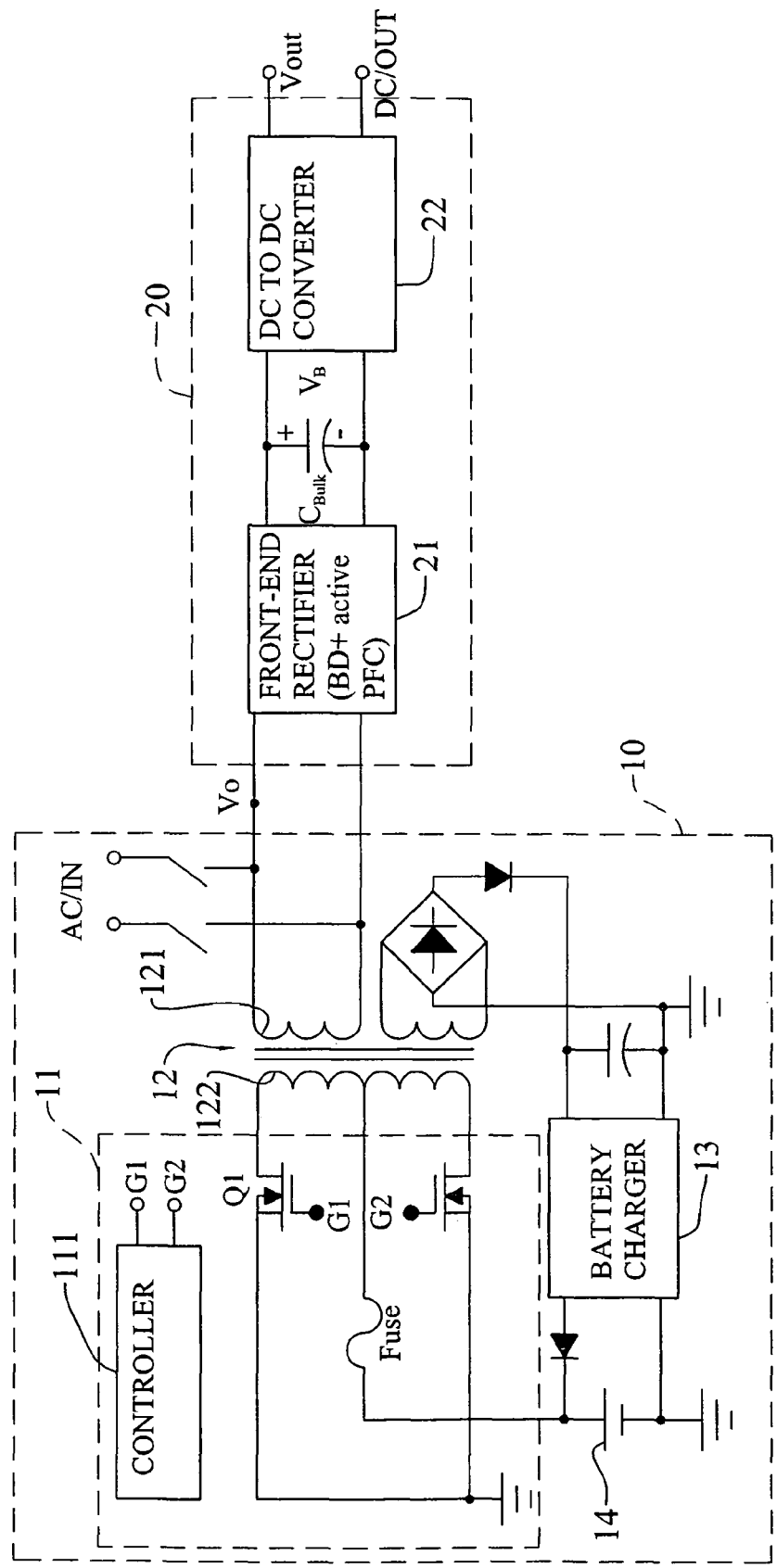
FIG. 1 is a circuit diagram of a UPS connected to an active PFC switching power supply as a load having a hold-up time circuit in accordance with the present invention.

With reference to FIG. 1, a preferred embodiment of the UPS (10) and the active PFC switching power supply (20) is used as a load of the UPS (10). The UPS (10) has an inverter (11), a transformer (12), a battery charger (13) and a battery set (14).

The transformer (12) has a primary winding (121) and a secondary winding (122). The first winding (121) is connected to an AC power source (AC/IN) and the active PFC switching power supply (20).

An input of the battery charger (13) and an output of the inverter (11) are connected to the secondary winding (122). The inverter (11) has a controller (111) and two power transistors (Q1, Q2) such as a power MOSFET OR IGBT. In the preferred embodiment, each power transistor (Q1, Q2) is a power MOSFET and a gate terminal (G1, G2) is a controlling terminal. The controlling terminal is connected to the controller (111). The controller (111) has the line mode and the battery mode. When the AC power source is terminated, the controller (111) executes the battery mode and outputs two PWM signals to the corresponding controlling terminals (G1, G2) of the two power transistors (Q1, Q2). Therefore, the two power transistors (Q1, Q2) are alternately switched by the controller (111) at the battery mode. Further, the two power transistors (Q1, Q2) are connected between the secondary winding (122) of the transformer (12) and the battery set (14).

Therefore, a DC power source stored in the battery set (14) is converted to the square wave through the inverter (11). The square wave is supplied to the active PFC switching power supply (20).

The battery charger (13) is connected between the secondary winding (122) and the battery set (14). When the AC power source is normal, the battery set (14) will be charged to store the DC power through the battery charger (13). At the battery mode, the battery charger (13) does not operate.

When the AC power source is normal, the AC power source is connected to the active PFC switching power supply (20) and the battery set (14) is charged through the battery charger (13). If the AC power source is abnormal or terminated, the line mode fails and the inverter (11) converts the DC power of the battery set (14) to the square wave.

Figure 2B:
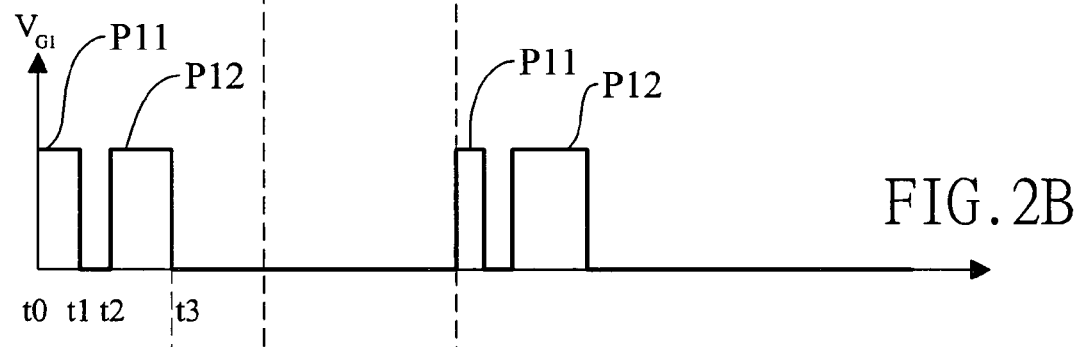
Figure 2C:
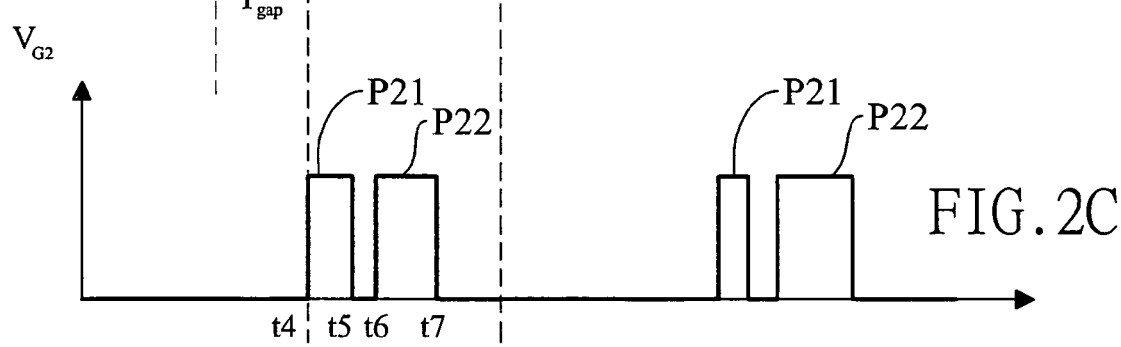

To implement the second act of the controlling method of the present invention, with further reference to FIG. 2B and 2C, the controller (111) outputs two PWM signals ($V_{G1}$, $V_{G2}$) to the corresponding power transistors (Q1, Q2) to alternately switch the two power transistors (Q1, Q2). Each of the PWM signals ($V_{G1}$, $V_{G2}$) has a period the same as that of the square wave power source. Each period has multiple pulses (P11, P12) (P21, P22) and an amount of width time of the multiple pulses is equal to a specific pulse width time (T11). Further, a time gap ($T_{gap}$) between two adjacent pulses (P12, P21) of the two PWM signals ($V_{G1}$, $V_{G2}$) is equal to or less than the hold-up time (about 8ms). Therefore, the controller (111) has to continually switch the corresponding power transistor (Q1, Q2) several times. In this preferred embodiment, one period of the PWM signal has two pulses (P11), and the corresponding power transistor (Q1) is switched by the controller (111) twice in one period (T). Therefore, a time gap ($T_{gap}$) between two adjacent pulses (P12) (P21) of the two PWM signals ($V_{G1}$, $V_{G2}$) is decreased and is equal to or less than the hold-up time (about 8ms). With further reference to FIG. 2A, the UPS (10) outputs the square wave (Vo) to the active PFC switching power supply (20).

Figure 3A:
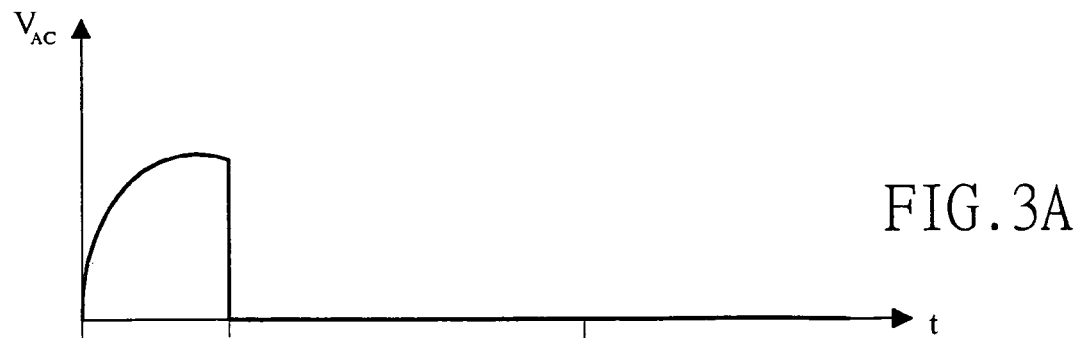
FIGS. 3A to 3D are voltage waveform diagrams of an AC power source, the UPS and the active PFC switching power supply.
Figure 3B:
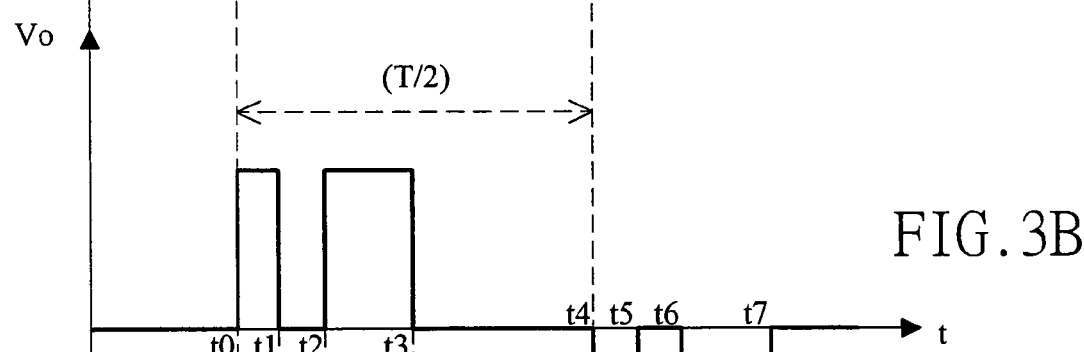
Figure 3C:
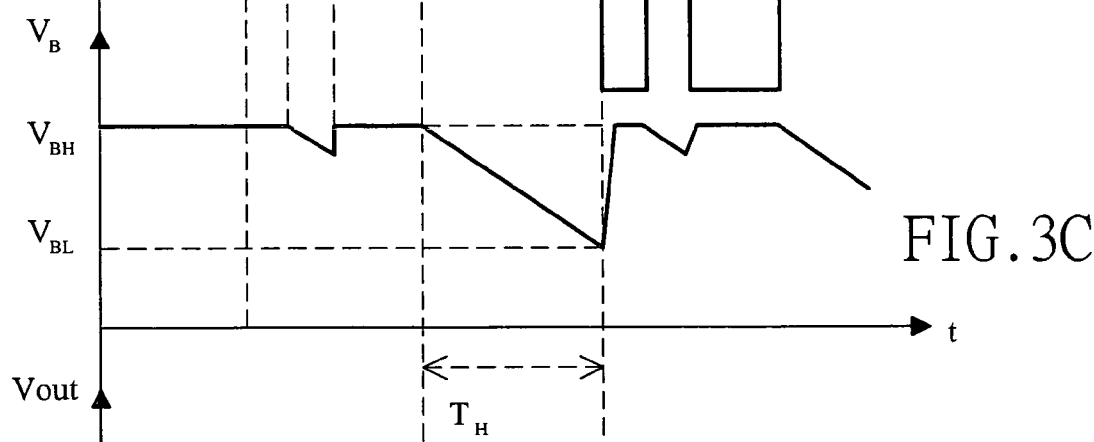
Figure 3D:
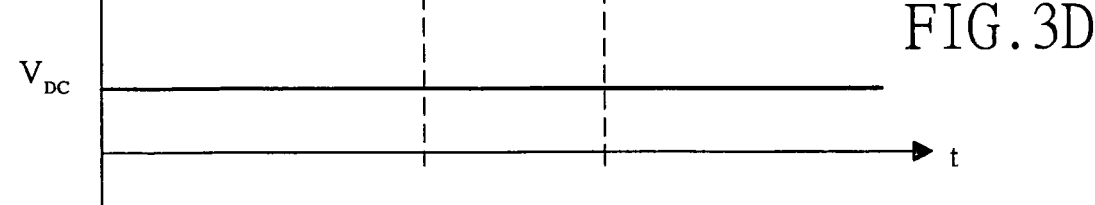
Figure 4:
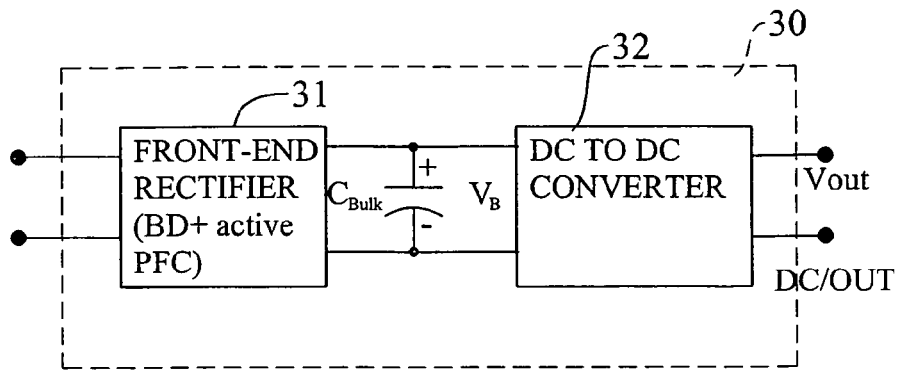
FIG. 4 is block diagram of an active PFC switching power supply.
Figure 5A:
FIGS. 5A and 5B are voltage waveform diagrams of an AC power source and a bulk capacitor of the active PFC switching power supply.
Figure 5B:
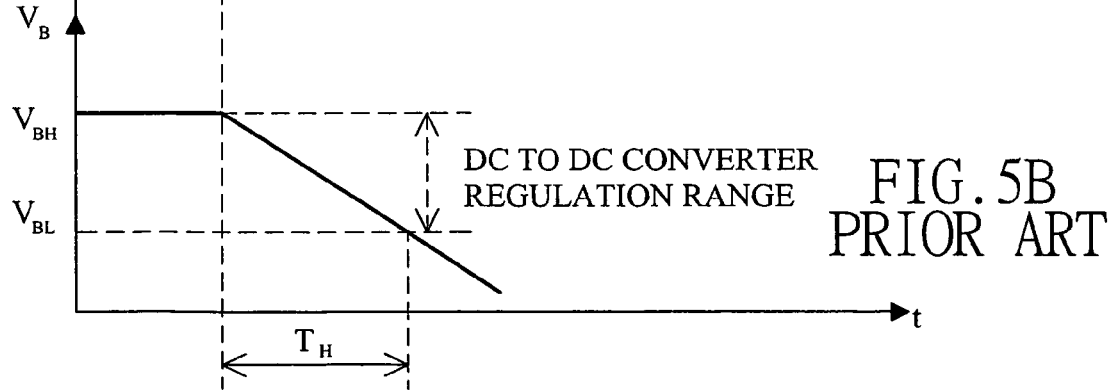
Figure 6:
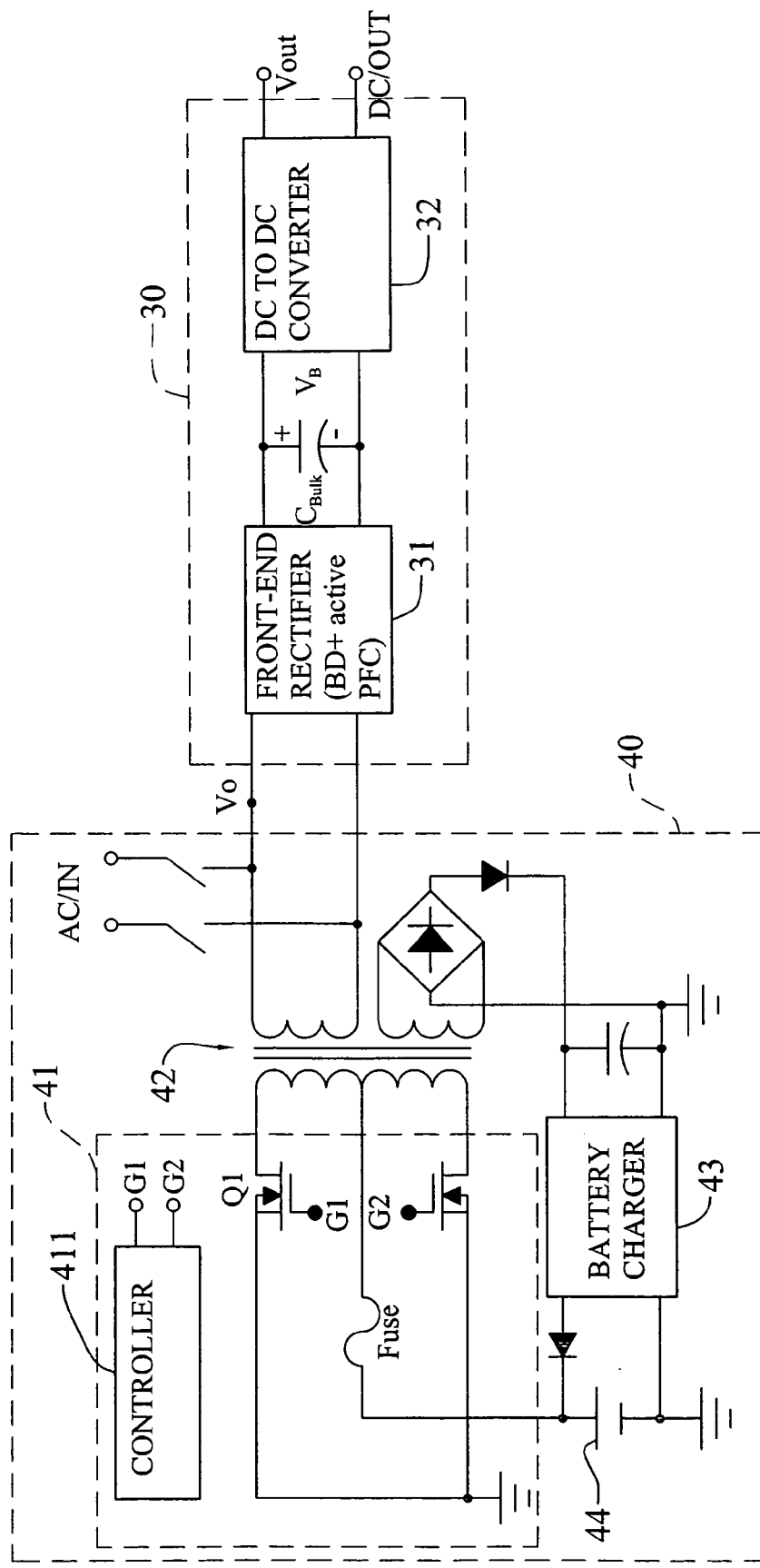
FIG. 6 is a circuit diagram of a UPS connected to the active PFC switching power supply of FIG. 4 as a load having a hold-up time circuit.
Figures 7A, 7B, 7C:
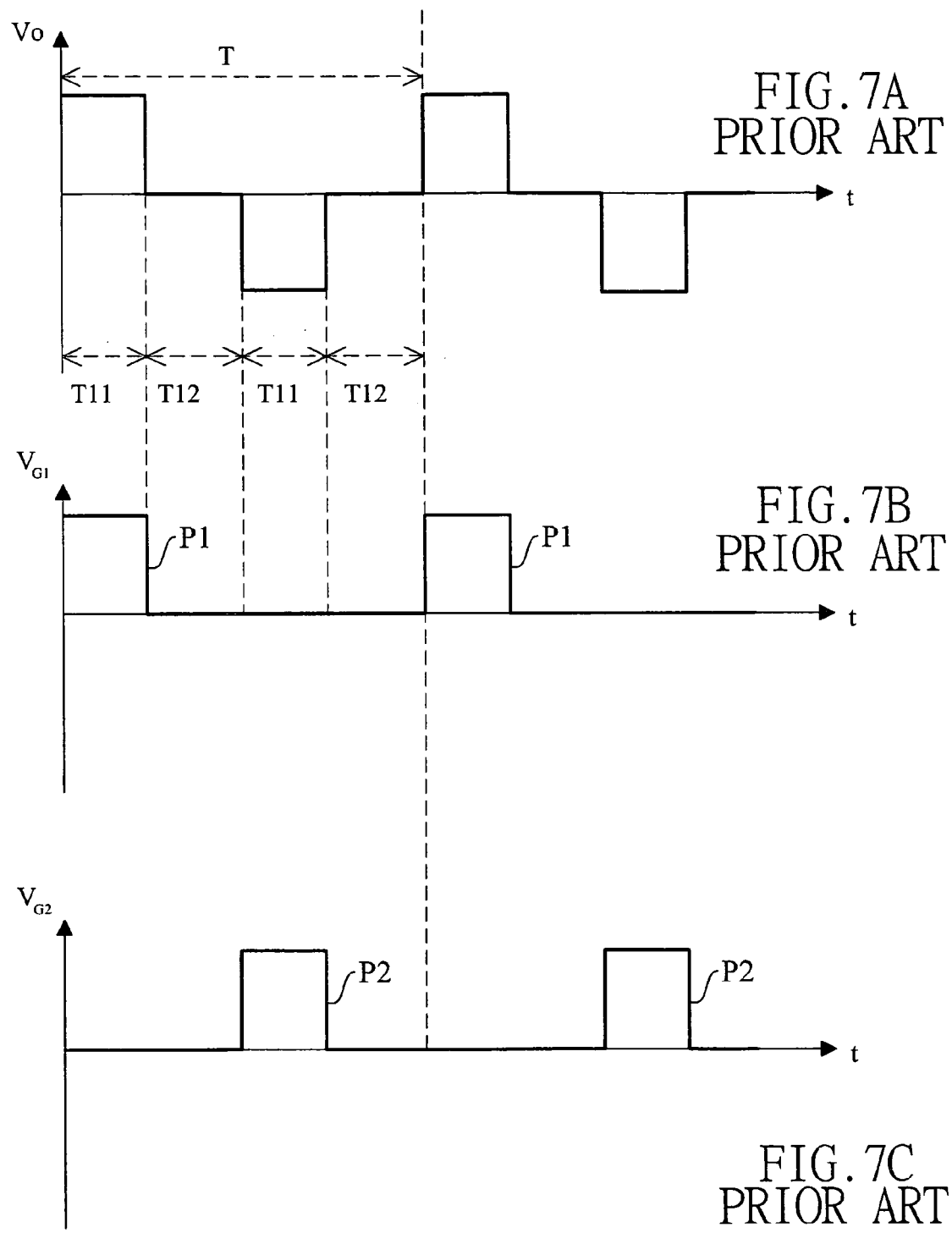
FIGS. 7A to 7C are voltage waveform diagrams of the UPS of FIG. 6.
Figures 8A, 8B, 8C, 8D:
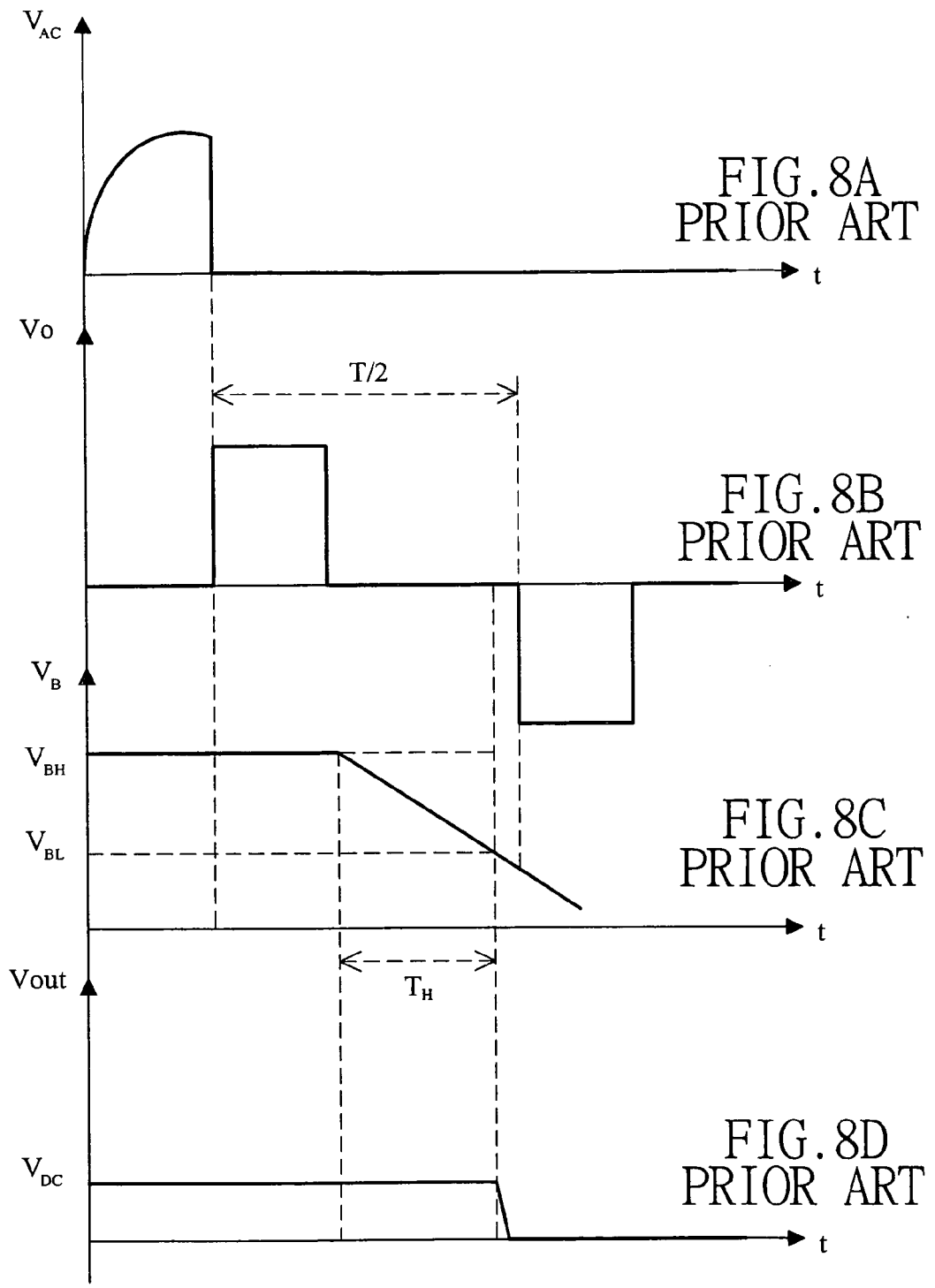
FIGS. 8A to 8D are voltage waveform diagrams of the AC power source, the UPS and the active PFC switching power supply.

With further reference to FIG. 3A and 3B, when the AC power (Vac) is terminated, the UPS (10) executes the battery mode and the square wave is supplied to the active PFC switching power supply (20). With further reference to FIG. 3C, the voltage ($V_B$) of the bulk capacitor ($C_{BULK}$) of the active PFC switching power supply (20) under a discharge condition is not lower than the low threshold voltage, since the OFF time (t1-t2) (t3-t4) of the square wave signal (Vo) will be kept equal to or less than the hold-up time. With further reference to FIG. 3D, the DC to DC converter (22) has enough emergency power (Vout) from the bulk capacitor ($C_{BULK}$) to convert it to the DC power source ($V_{DC}$). Therefore, the present invention ensures to supply an emergency power to the active PFC switching power supply during hold-up time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A controlling method of a battery mode of a UPS for an active PFC load, wherein the UPS has an inverter, a transformer, a battery charger and a battery set and the controlling method comprises acts of:

monitoring the AC power source and determining whether the AC power source is terminated or not; wherein if a determining result is positive go to next act; and switching to the battery mode and converting a DC power source of the battery set to a square wave, wherein the square wave has a period, and each half of the period is alternately constituted by at least two ON times and at least two OFF times, and each of the at least two OFF times is equal to or less than a hold-up time of the active PFC load having a hold-up time circuit.

2. The controlling method as claimed in claim 1, wherein the duration of the OFF time is less than 8 ms.

3. The controlling method as claimed in claim 1, wherein the transformer having a primary winding and a secondary winding, wherein the primary winding is connected to the AC power source;

the inverter has a controller and two power transistors each of which has a controlling terminal connected to the controller, wherein the two power transistors are connected between the secondary winding and the battery set, and the controller outputs two PWM signals to the controlling terminals of the corresponding power transistors to alternately switch two power transistors, wherein each PWM signal has a pulse width consisted by multiple widths of multiple pulses and a time gap between the two widths of the pulses is equal to or less than the hold-up time.

4. The controlling method as claimed in claim 1, wherein the hold-up time is at least 8 ms.

* * * * *